United States Patent
McGinnis et al.

(10) Patent No.: US 10,208,671 B2
(45) Date of Patent: Feb. 19, 2019

(54) TURBINE COMPONENT INCLUDING MIXED COOLING NUB FEATURE

(71) Applicant: United Technologies Corporation, Farmington, MI (US)

(72) Inventors: Christine F. McGinnis, New Britain, CT (US); Karl A. Mentz, Reading, MA (US); James Tisley Auxier, Bloomfield, CT (US)

(73) Assignee: United Technologies Corporation, Farmington, CT (US)

( * ) Notice: Subject to any disclaimer, the term of this patent is extended or adjusted under 35 U.S.C. 154(b) by 307 days.

(21) Appl. No.: 14/945,939

(22) Filed: Nov. 19, 2015

(65) Prior Publication Data

US 2017/0145922 A1    May 25, 2017

(51) Int. Cl.
  *F02C 7/18* (2006.01)
  *F02C 7/12* (2006.01)
  *F01D 5/18* (2006.01)

(52) U.S. Cl.
  CPC ........... *F02C 7/18* (2013.01); *F01D 5/187* (2013.01); *F02C 7/12* (2013.01); *F05D 2240/81* (2013.01); *F05D 2250/18* (2013.01); *F05D 2250/28* (2013.01); *F05D 2260/2214* (2013.01)

(58) Field of Classification Search
  CPC .... F02C 7/12; F02C 7/18; F01D 5/187; F05D 2240/81; F05D 2260/2214
  See application file for complete search history.

(56) References Cited

U.S. PATENT DOCUMENTS

| | | | |
|---|---|---|---|
| 4,017,213 A | | 4/1977 | Przirembel |
| 4,515,523 A | * | 5/1985 | North .......... F01D 5/187 415/115 |
| 5,695,320 A | * | 12/1997 | Kercher .......... F01D 5/187 415/115 |
| 5,700,132 A | * | 12/1997 | Lampes .......... F01D 5/187 415/115 |
| 5,738,493 A | * | 4/1998 | Lee .......... F01D 5/187 415/115 |
| 6,155,778 A | | 12/2000 | Lee et al. |
| 7,681,398 B2 | * | 3/2010 | Patel .......... F02C 3/145 60/752 |
| 7,704,039 B1 | | 4/2010 | Liang |
| 7,722,315 B2 | | 5/2010 | Lee et al. |
| 8,814,518 B2 | * | 8/2014 | Harris, Jr. .......... F01D 5/081 29/557 |

(Continued)

FOREIGN PATENT DOCUMENTS

| | | |
|---|---|---|
| EP | 2602439 | 6/2013 |
| EP | 2927430 | 10/2015 |
| WO | 2014151299 | 9/2014 |

OTHER PUBLICATIONS

European Search Report for Application No. 16199681.4 dated Mar. 20, 2017.

*Primary Examiner* — Steven Sutherland
(74) *Attorney, Agent, or Firm* — Carlson, Gaskey & Olds, P.C.

(57) ABSTRACT

A component for a gas turbine engine includes at least one cooled surface configured to contact a cooling flow, the at least one cooled surface has a base surface and a plurality of cooling nubs disposed about the base surface. The plurality of cooling nubs are distributed about the base surface in a mixed pattern.

10 Claims, 2 Drawing Sheets

(56) References Cited

U.S. PATENT DOCUMENTS

| | | | |
|---|---|---|---|
| 8,840,371 B2* | 9/2014 | Simpson | F01D 5/187 416/97 R |
| 8,876,458 B2 | 11/2014 | Thibodeau et al. | |
| 2006/0093480 A1 | 5/2006 | Cunha et al. | |
| 2012/0189426 A1 | 7/2012 | Thibodeau et al. | |
| 2013/0209217 A1* | 8/2013 | Butler | F01D 9/041 415/1 |
| 2014/0112799 A1 | 4/2014 | Lee et al. | |
| 2014/0321980 A1 | 10/2014 | Lee et al. | |

* cited by examiner

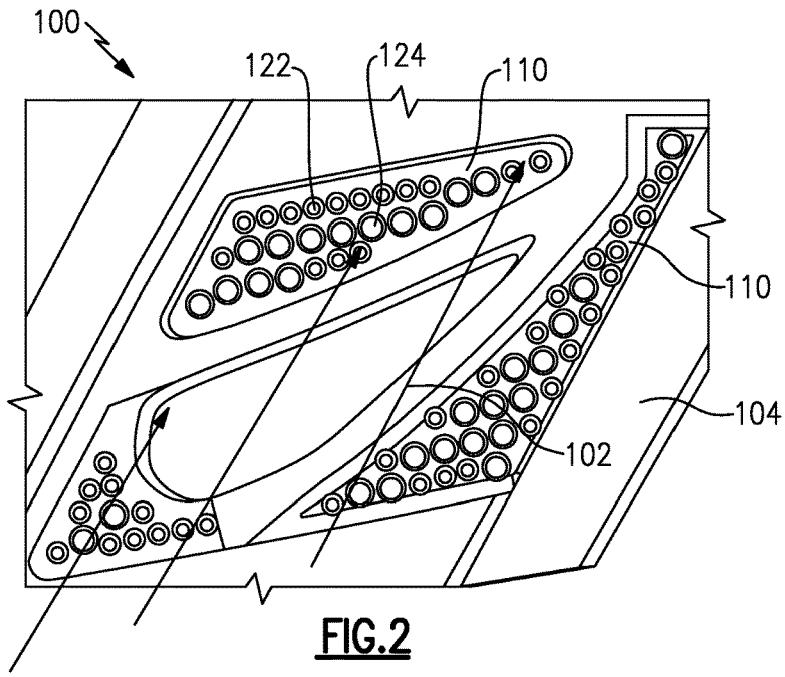
FIG.2
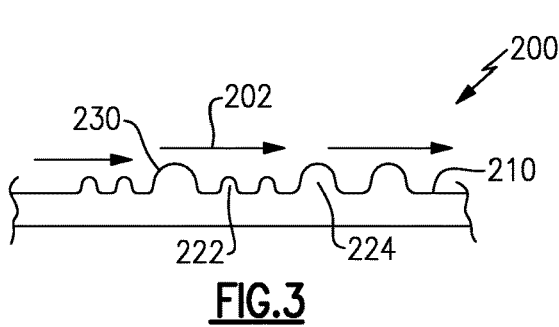
FIG.3
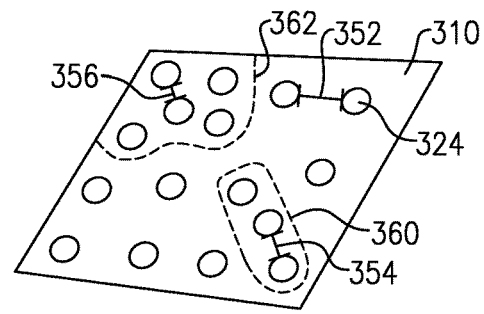
FIG.4
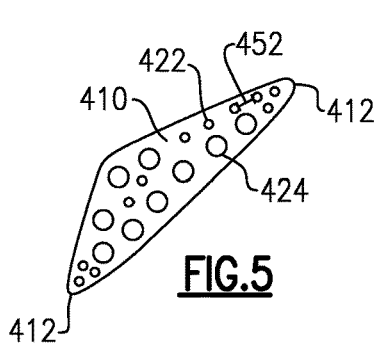
FIG.5
FIG.6A  FIG.6B  FIG.6C
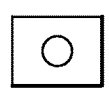  
FIG.7A  FIG.7B  FIG.7C

TURBINE COMPONENT INCLUDING MIXED COOLING NUB FEATURE

TECHNICAL FIELD

The present disclosure relates generally to cooling features for gas turbine engine components, and more specifically to a mixed cooling nub feature for the same.

BACKGROUND

Components within gas turbine engines, such as aircraft engines, land based turbines, and the like, are frequently exposed to high temperatures due to the operation of the gas turbine engine. In order to mitigate the effects of the high temperatures, some components are exposed to cooling flows and convective heat transfer from the component to the cooling flow cools the component.

The cooling flow continuously cycles a coolant, such as air, over one or more surface of the component. The cycling of the coolant removes the warmed coolant and replaces the warmed coolant with a cooled coolant. In a closed loop coolant system, the warmed coolant is passed to a cooler, alternately referred to as a condenser, where it is cooled and returned to the coolant flow. In an open loop cooling system, cooled coolant is drawn from a supply, passed over the component and expelled.

SUMMARY OF THE INVENTION

In one exemplary embodiment a component for a gas turbine engine includes at least one cooled surface configured to contact a cooling flow, the at least one cooled surface having a base surface and a plurality of cooling nubs disposed about the base surface, and the plurality of cooling nubs are distributed about the base surface in a mixed pattern.

In another exemplary embodiment of the above described component for a gas turbine engine the mixed pattern includes a non-uniform distance between each cooling nub and each adjacent cooling nub.

In another exemplary embodiment of any of the above described components for a gas turbine engine the mixed pattern includes a combination of at least two sizes of cooling nubs.

In another exemplary embodiment of any of the above described components for a gas turbine engine the mixed pattern further includes a non-uniform distance between each cooling nub and each adjacent cooling nub.

In another exemplary embodiment of any of the above described components for a gas turbine engine the mixed pattern further includes at least two distinct cooling nub geometries.

In another exemplary embodiment of any of the above described components for a gas turbine engine the at least two distinct cooling nub geometries include at least one of: multiple distinct cross sectional geometries and multiple distinct geometrical configurations.

In another exemplary embodiment of any of the above described components for a gas turbine engine each of the at least one cooled surfaces is a single cast component, and each of the cooling nubs is integral to the base surface.

In another exemplary embodiment of any of the above described components for a gas turbine engine the cast component includes post-cast finishing.

In another exemplary embodiment of any of the above described components for a gas turbine engine a surface area of the base surface and a surface area of each of the cooling nubs is a convective cooling surface.

In another exemplary embodiment of any of the above described components for a gas turbine engine at least one of the cooled surfaces is a recessed surface, and wherein the mixed pattern of cooling nubs includes cooling nubs having a first size and cooling nubs having a second size smaller than the first size.

In another exemplary embodiment of any of the above described components for a gas turbine engine cooling nubs within a predetermined distance of an edge of the recessed surface are the second size.

In another exemplary embodiment of any of the above described components for a gas turbine engine the cooling nubs extend outward from the cooled surface into the cooling flow.

In one exemplary embodiment a gas turbine engine includes a compressor section, a combustor section fluidly connected to the compressor section, a turbine section fluidly connected to the combustor section, and at least one convectively cooled component within the gas turbine engine, the convectively cooled component including at least one cooled surface configured to contact a cooling flow, the at least one cooled surface including a plurality of cooling nubs arranged in a mixed pattern.

In another exemplary embodiment of the above described gas turbine engine the mixed pattern includes at least one of a non-uniform distance between each cooling nub and each adjacent cooling nub and a combination of at least two sizes of cooling nubs.

In another exemplary embodiment of any of the above described gas turbine engines the mixed pattern further includes at least two distinct cooling nub geometries.

In another exemplary embodiment of any of the above described gas turbine engines the at least two distinct cooling nub geometries include at least one of: multiple distinct cross sectional geometries and multiple distinct geometrical configurations.

In another exemplary embodiment of any of the above described gas turbine engines each of the at least one cooled surfaces is a single cast component, and each of the cooling nubs is integral to the cooled surface.

In another exemplary embodiment of any of the above described gas turbine engines the at least one cooled surface includes a surface recessed into the convectively cooled component.

An exemplary method of enhancing cooling for a gas turbine engine component includes disposing a plurality of cooling nubs on a cooled surface according to a mixed pattern including at least one of multiple distinct sizes of cooling nubs, a varied concentration of cooling nubs, and a varied geometry of cooling nubs.

In another example of the above described exemplary method of enhancing cooling for a gas turbine engine component disposing a plurality of cooling nubs on the cooled surface includes casting the cooled surface and the cooling nubs as a single integral element.

These and other features of the present invention can be best understood from the following specification and drawings, the following of which is a brief description.

BRIEF DESCRIPTION OF THE DRAWINGS

FIG. 2 schematically illustrates a partial view of a gas turbine engine component.

FIG. 3 schematically illustrates a cross sectional view of a portion of a gas turbine engine component.

FIG. 4 schematically illustrates a top view of a cooled surface of a gas turbine engine component.

FIG. 5 schematically illustrates a top view of an alternate cooled surface of a gas turbine engine component.

FIG. 6A schematically illustrates a cross sectional view of an exemplary cooling nub geometry.

FIG. 6B schematically illustrates a cross sectional view of an exemplary cooling nub geometry.

FIG. 6C schematically illustrates a cross sectional view of an exemplary cooling nub geometry.

FIG. 7A schematically illustrates a top view of an exemplary cooling nub geometry.

FIG. 7B schematically illustrates a top view of an exemplary cooling nub geometry.

FIG. 7C schematically illustrates a top view of an exemplary cooling nub geometry.

DETAILED DESCRIPTION OF AN EMBODIMENT

Figure 1:
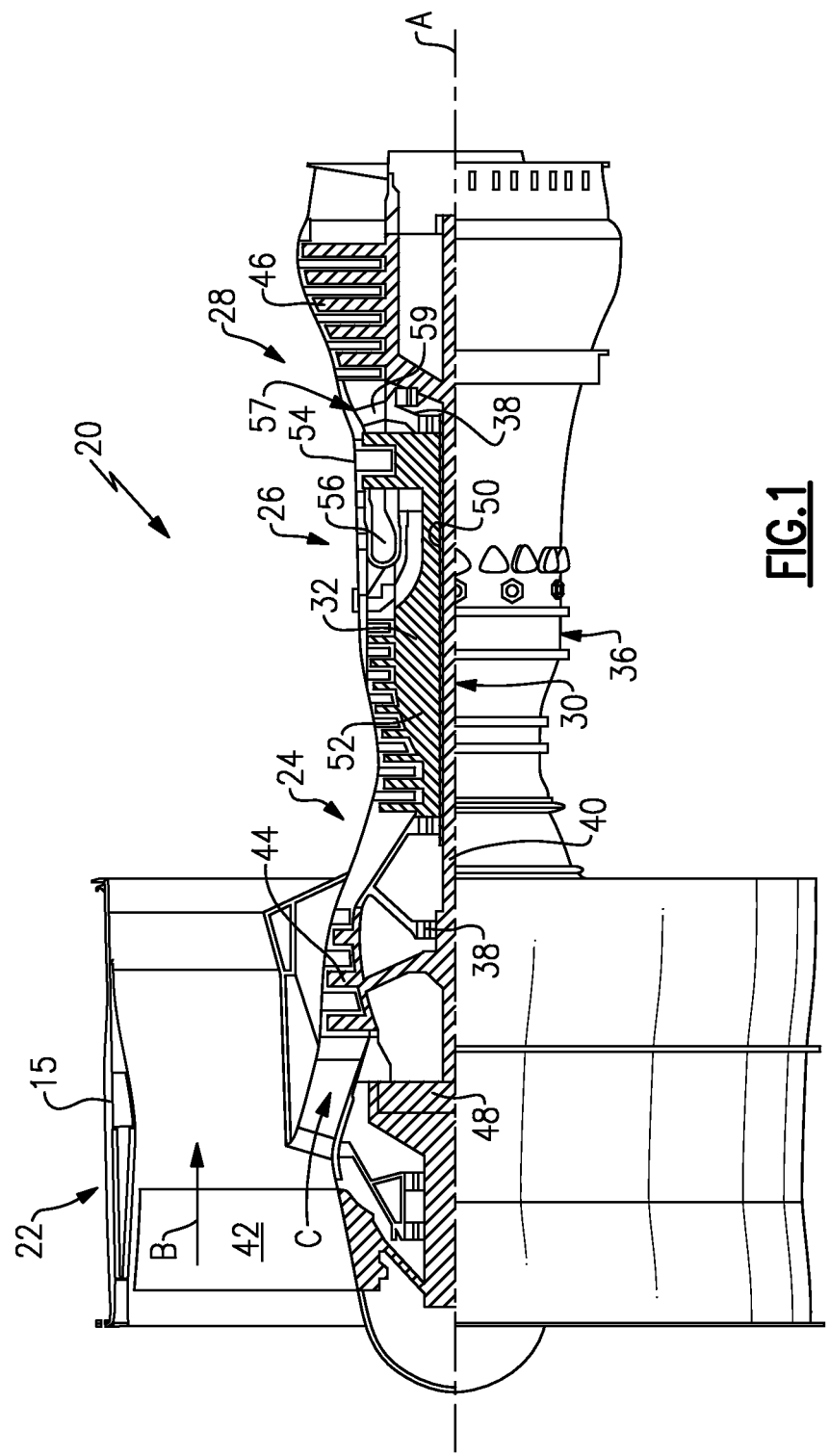
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

Gas turbine engines, such as the exemplary gas turbine engine described above and illustrated in FIG. 1, include sections that are subjected to extreme heat during operation of the gas turbine engine. In order to prevent components subjected to the extreme heat from being damaged or from having a decreased component life, the components are actively cooled using a cooling system built into the gas turbine engine. In one example, some or all of a component is cooled by passing a cooled fluid (referred to as a coolant) over one or more surfaces of the component. The coolant flow absorbs heat from the surface of the component that is exposed to the coolant flow in a convective cooling manner. The coolant flow can be generated using any known cooling system including open loop cooling systems and closed loop cooling systems.

FIG. 2 schematically illustrates a partial view of a gas turbine engine component 100 cooled using convective cooling. The component 100 includes a complex geometry having at least one cooled surface 110. In the illustrated example, the cooled surface 110 is recessed relative to one or more adjacent surfaces. A cooling flow 102 passes across the component 100 and contacts the cooling surfaces 110. Heat is removed from the component 100 into the cooling flow 102 via conduction. The amount of heat that is removed can be expressed as $Q=hA(T_w-T_c)$, where h is the local heat transfer coefficient of the cooled surface 110, A is the surface area of the cooled surface 110, Tw is the temperature of the cooled surface 110, TC is the temperature of the coolant, and Q is the magnitude of heat removed from the component 100 via the cooling flow 102.

One of skill in the art will appreciate that the magnitude of heat removed from the component 100 is directly proportional to the surface area (hA) of the cooled surface 110. In order to increase the surface area of the cooled surface 110 that is exposed to the cooling flow 102, the cooled surface 110 includes multiple cooling nubs 122, 124 distributed across the surface 110. The cooling nubs 122, 124 are extensions of the cooled surface that protrude into the cooling flow 102. As can be seen in the example of FIG. 2, the cooling nubs 122, 124 can be distributed unevenly across the cooled surface 110, and can be unevenly sized. In alternative examples, the cooling nubs 122, 124 can further be different geometric shapes, depending on the features needed at a given portion of the surface 110. The lack of uniformity in size, shape and/or positioning of the cooling nubs 122, 124 is referred to herein as a "mixed pattern."

With continued reference to FIG. 2, and with like numerals indicating like elements, FIG. 3 schematically illustrates a partial cross sectional view of a cooled surface 210. A cooling flow 202 passes across the cooled surface 210 and allows for convective cooling, as described above. Each of the cooling nubs 222, 224 extends outward from the base portion of the surface 210 into the cooling flow 202. By extending the cooling nubs 222, 224 into the cooling flow 202, the surface area of the cooled surface 210 is increased by the surface area of the sides 230 of the cooling nubs 222, 224. As can be seen in the illustration, the larger the cooling nub 222, 224, the larger the additional surface area created by the cooling nubs 222, 224. Further, as described above, the larger the surface area of the cooled surface 210, the larger the magnitude of heat transferred from the component 200 into the cooling flow 202.

In certain examples, and with certain components, the size of the cooling nub 222, 234 is limited by the geometry of the component 200 or of adjacent parts within the gas turbine engine. In such examples, some portions of the surface can utilize smaller nubs 222 while other portions utilize larger nubs 224. The smaller nubs 222 allow the nubs 222 to be positioned closer to an edge of the cooled surface 210, and are shorter, causing less interference with adjacent components within the gas turbine engine.

Further, in some examples the component including the cooled surface 210 can include cast features, or be a single cast component. In such examples, one or more of the cooled surfaces 210 is a cast feature, with the cooling nubs 222, 224 being cast integral to the cooled surface 210. Due to the nature of the cooling nubs 222, 224, the larger cooling nubs 224 are unable to be properly cast adjacent to, or within a certain distance of, the edges of the cooled surface 210 using some casting techniques. In such examples, the utilization of mixed size cooling nubs 222, 224 allows for an increased number of cooling nubs 222, 224 by allowing smaller nubs 222 to be positioned at the edge of the cooled surface 210, where larger nubs 224 are unable to be positioned.

In some examples, certain regions of the cooled surface 110, 210 can benefit from additional cooling relative to a remainder of the cooled surface 110, 210. An additional cooling requirement in one region is referred to as a localized cooling requirement. To facilitate the localized cooling requirements of different regions of the cooled surface 210, the cooling nubs 222, 224 are arranged, in some examples, with a greater concentration of the cooling nubs 222, 224 in the region(s) requiring greater cooling.

With continued reference to FIGS. 2 and 3, and with like numerals indicating like elements, FIG. 4 schematically illustrates a top view of a cooled surface 310 of a gas turbine engine component. Protruding from the cooled surface 310 are multiple cooling nubs 324. In the illustrated example of FIG. 4, each of the cooling nubs 324 is the same size and shape as each other of the cooling nubs 324. In alternative examples, different sized nubs, or different geometry nubs can be intermixed with the cooling nubs 324 to further enhance localized cooling.

The cooled surface 310 includes a first region 360 and a second region 362 where increased cooling, relative to a remainder of the cooled surface 310, is required. In the first region 360, a distance 354 between the cooling nubs 324 and each adjacent cooling nub 324 is decreased relative to the distance 352 between the cooling nubs 324 outside of the regions 360 requiring increased cooling. In the second region 362 requiring increased cooling, the distance 356 between the cooling nubs 324 is reduced even further. As a result of the illustrated mixed pattern nub configuration of FIG. 4, both the first and second regions 360, 362 requiring increased cooling are cooled more than the remainder of the cooled surface 310, and the second region is further cooled more than the first region 360.

In alternative examples, the cooled surface 310 can include features that prevent ideal sized cooling nubs from being positioned near or adjacent to an edge of the cooling surface. By way of example, if the cooled surface 310 is indented into an edge or surface of the component, such as is the case with a recessed surface, cooling nubs near the edge of the cooled surface 310 can undesirably merge with the edge during some casting processes.

With continued reference to FIGS. 2-4, FIG. 5 illustrates one such example cooling surface 410. The cooling surface 410 includes acute angled corners 412. Due to the acute angle of the corners and the desired casting process, large cooling nubs 424 cannot be positioned near the acute angle corners 412. In order to increase the cooling at the acute angled corners 412, the mixed pattern of cooling nubs 422, 424 includes smaller cooling nubs 422 capable of being cast without interfering with the edge of the cooling surface 410. In some examples a distance 452 between each cooling nub 422, 424 and each cooling nub 422, 424 of similar size is uniform across the cooling surface. In alternative examples, the distance 452 can be varied to allow for localized increased cooling as described above with regards to FIG. 4.

While illustrated above as hemispherical nubs in the examples of FIGS. 2-5, the cooling nubs can be any cast shape. With continued reference to FIGS. 2-5, FIG. 6 illustrates three potential cooling nub cross sections 6A, 6B, 6C. The illustrated cross sections are exemplary, and one of skill in the art will appreciate that any cast shape can be suitable as a cooling nub shape. Nub 6A has a rectangular cross section, nub 6B has a hemispherical cross section, and nub 6C has a triangular cross section.

Each of the cross sections 6A, 6B, 6C has advantages and disadvantages relative to the other cross sections 6A, 6B, 6C. By way of example, the triangular cross section 6C has the lowest increase in surface area, and thus the least increase in effective cooling, however the triangular cross section also utilizes the least amount of material and has the lowest weight of the illustrated cross sections. In contrast, the rectangular cross section has the largest increase in surface area but the largest accompanying increase in material and weight.

In yet further examples, the cooling nubs can have different geometric configurations designed to conform with, or otherwise adapt to, the geometric configuration of the cooled surface. With continued reference to FIGS. 2-6, FIG. 6 illustrates top views of three exemplary geometric configurations 7A, 7B, 7C. 7A illustrates the hemispherical configuration described and illustrated in FIGS. 2-5. 7B illustrates a curved configuration. 7C illustrates an s-shaped configuration. The varied geometric configurations affect the flow of coolant over the cooled surface in known manners, and a specific configuration can be chosen to achieve desired flow parameters.

In further examples, the geometric configuration can be altered to better fit limited constraints of specific cooled surfaces and component designs, and are not limited to the illustrated examples of FIG. 7. Further, the cooling nubs on a given cooled surface can be a mixture of multiple different geometric configurations and cross section shapes depending on the needs of a specific implementation.

While described individually above, one of skill in the art will understand that the described mixed patterns of nubs can be used in combination with any number of the other described mixed patterns and still fall within the instant disclosure.

Further, while described above as cooling nubs protruding outward form a surface, one of skill in the art having the benefit of this disclosure will understand that the cooling nubs can, in examples with a sufficiently angled cooling flow, be inverted and protrude inward into the surface. In such an example, a single cooled surface could utilize only inverted cooling nubs, or a mixture of standard cooling nubs and inverted cooling nubs.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A component for a gas turbine engine comprising:
   at least one cooled surface configured to contact a cooling flow, the at least one cooled surface being recessed relative to one or more adjacent surfaces;
   the at least one cooled surface having a base surface and a plurality of cooling nubs disposed about the base surface, each cooling nub in the plurality of cooling nubs being an extension of the at least one cooled surface and protruding outward from the at least one cooled surface;
   the plurality of cooling nubs are distributed about said base surface in a mixed pattern, wherein the mixed pattern includes a first set of cooling nubs and a second set of cooling nubs, each cooling nub in the second set of cooling nubs being larger than each cooling nub in the first set of cooling nubs, and wherein the cooling nubs in the first set of cooling nubs are positioned closer to an edge of the at least one cooled surface than the cooling nubs in the second set of cooling nubs; and
   wherein said mixed pattern is defined at least in part by each cooling nub including a plurality of distances defined between the cooling nub and each other cooling nub adjacent to the cooling nub, and the plurality of distances is non-uniform.

2. The component of claim 1, wherein said mixed pattern further includes at least two distinct cooling nub geometries.

3. The component of claim 2, wherein said at least two distinct cooling nub geometries include at least one of: multiple distinct cross sectional geometries and multiple distinct geometrical configurations.

4. The component of claim 1, wherein each of said at least one cooled surfaces is a single cast component, and each of said cooling nubs is integral to said base surface.

5. The component of claim 4, wherein said cast component includes post-cast finishing.

6. The component of claim 1, wherein the cooling nubs extend outward from said at least one cooled surface into said cooling flow.

7. A gas turbine engine comprising:
   a compressor section;
   a combustor section fluidly connected to the compressor section;
   a turbine section fluidly connected to the combustor section;
   at least one convectively cooled component within said gas turbine engine, the at least one convectively cooled component including at least one cooled surface configured to contact a cooling flow, the at least one cooled surface including a plurality of cooling nubs arranged in a mixed pattern and being recessed relative to one or more adjacent surfaces, each cooling nub in the plurality of cooling nubs being an extension of the at least one cooled surface and protruding outward from the at least one cooled surface and the mixed pattern includes a first set of cooling nubs and a second set of cooling nubs, each cooling nub in the second set of cooling nubs being larger than each cooling nub in the first set of cooling nubs, and wherein the cooling nubs in the first set of cooling nubs are positioned closer to an edge of the at least one cooled surface than the cooling nubs in the second set of cooling nubs; and
   wherein said mixed pattern is defined at least in part by each cooling nub including a plurality of distances defined between the cooling nub and each other cooling nub adjacent to the cooling nub, and the plurality of distances is non-uniform.

8. The gas turbine engine of claim 7, wherein said mixed pattern further includes at least two distinct cooling nub geometries.

9. The gas turbine engine of claim 8, wherein said at least two distinct cooling nub geometries include at least one of: multiple distinct cross sectional geometries and multiple distinct geometrical configurations.

10. The gas turbine engine of claim 7, wherein each of said at least one cooled surfaces is a single cast component, and each of said cooling nubs is integral to said at least one cooled surface.

* * * * *